(12) United States Patent
Lob (10) Patent No.: US 7,719,393 B1
(45) Date of Patent: May 18, 2010

(54) MOTOR VEHICLE ACTUATING DEVICE

(75) Inventor: Helke Lob, Ehrwalder Stasse 82, D-81377 Munich (DE)

(73) Assignee: Helke Lob, Munich (DE)

( * ) Notice: Subject to any disclaimer, the term of this patent is extended or adjusted under 35 U.S.C. 154(b) by 0 days.

(21) Appl. No.: 09/623,840

(22) PCT Filed: Mar. 11, 1999

(86) PCT No.: PCT/EP99/01585

§ 371 (c)(1),
(2), (4) Date: Sep. 28, 2001

(87) PCT Pub. No.: WO99/46138

PCT Pub. Date: Sep. 16, 1999

(30) Foreign Application Priority Data

Mar. 11, 1998 (DE) ................................ 198 11 268

(51) Int. Cl.
*H01H 51/22* (2006.01)
(52) U.S. Cl. .................... 335/78; 335/220; 200/86.5
(58) Field of Classification Search .................. 335/78, 335/220–229, 302–306; 200/86.5; 338/99–101, 338/108, 11, 114–116, 198, 200
See application file for complete search history.

(56) References Cited

U.S. PATENT DOCUMENTS 4,639,710 A    1/1987 McMillian et al. .......... 338/108

(Continued)

FOREIGN PATENT DOCUMENTS

DE         82 25 779.5       1/1983

(Continued)

OTHER PUBLICATIONS

VDO Querschnitt 4, "Intelligente Regelung in der Motor-Peripherie", pp. 1-19 (with English Abstract).

(Continued)

*Primary Examiner*—Elvin G Enad
*Assistant Examiner*—Bernard Rojas
(74) *Attorney, Agent, or Firm*—Christie, Parker & Hale, LLP (57) ABSTRACT

An actuating apparatus for operating a drive or retardation means of a motor vehicle, comprising a signal converter (26; 60) which produces a control signal dependent on the actuating travel, wherein the signal converter (26; 60) comprises an elastic and conductive shaped body having a first and second outside surface which are arranged at a spacing relative to each other, which is provided with a first electrical contact region (29; 62) which extends over the first outside surface of the shaped body and which is galvanically conductively connected on the one hand to the shaped body and on the other hand to a first feed line (30; 64) and a second electrical contact region (29'; 63) which extends along the second surface of the shaped body and is galvanically conductively connected on the one hand to the shaped body and on the other hand to a second feed line (30'; 65), and wherein the electrical resistance of the shaped body between the two contact regions (29, 29'; 62, 63) is dependent on the spacing of the two contact regions (29, 29'; 62, 63) and that connected downstream of the signal converter (26; 60) is a measurement transducer (32) whose outputs are connected by way of the feed lines (30, 30'; 64, 65) to the first and second contact regions (29, 29'; 62, 63) and at whose output a control signal (44) can be taken off, which is dependent on the electrical resistance of the shaped body.

21 Claims, 8 Drawing Sheets

U.S. PATENT DOCUMENTS

| | | | |
|---|---|---|---|
| 5,217,280 A * | 6/1993 | Nykerk et al. | 303/3 |
| 5,309,361 A * | 5/1994 | Drott et al. | 701/1 |
| 5,461,355 A | 10/1995 | Schemansky et al. | 338/108 |
| 5,583,303 A * | 12/1996 | Franz | 73/862.046 |
| 7,433,771 B2 * | 10/2008 | Herges | 701/70 |

FOREIGN PATENT DOCUMENTS

| | | |
|---|---|---|
| DE | 33 41 652 | 6/1985 |
| DE | 195 21 866 | 10/1996 |
| DE | 196 25 501 | 1/1998 |
| GB | 2 314 607 | 1/1998 |
| JP | 63318030 | 12/1988 |
| WO | WO92/05482 | 4/1992 |
| WO | WO95/27237 | 10/1995 |

OTHER PUBLICATIONS

English Translation of VDO Querschnitt 4, Mar. 1981, "Intelligente Regelung in der Motor-Peripherie", pp. 1-33 (previously filed).

* cited by examiner

MOTOR VEHICLE ACTUATING DEVICE

CROSS-REFERENCE TO RELATED APPLICATION

This application claims priority of International application No. PCT/EP99/01585, which in turn claims priority to German patent application number 198 11 268.8, filed 11 Mar. 1998.

The invention concerns an actuating apparatus for operating the drive, steering or retardation means of a motor vehicle, as set forth in the classifying portion of claim 1.

Known actuating apparatuses of that kind are generally in the form of a foot pedal which transmits the pedal pressure to the element to be activated by way of a lever transmission assembly and a cable or a hydraulic line.

A disadvantage of the known pedals is that the pedals and the connected linkages which are joined thereto entail a serious risk of injury in the event of an accident involving deformation of the passenger cell. For structural reasons it is also not possible for that risk of injury to be reduced by crumble zones or other deformation regions as the amount of space available for same is limited.

Therefore the object of the invention is to develop a foot-actuated actuating apparatus for a motor vehicle, which by virtue of its structural configuration in the event of a frontal impact of the motor vehicle substantially eliminates foot injuries to the vehicle driver.

That object is attained by the features recited in characterizing portion of claim 1.

The invention embraces the technical teaching that, for the purposes of actuating drive or retardation or deceleration means in a motor vehicle, there is provided a signal converter which has an elastic and conductive shaped body, wherein the shaped body has two electrical contact regions which are disposed on mutually opposite surfaces of the shaped body and which each have a respective feed line, and the feed lines are taken into a measurement transducer, at the output of which is a control signal as a measurement for the electrical resistance.

This therefore provides an actuating means which in normal operation, upon compression by means of a foot pressure, reduces its resistance and outputs a control signal, as was hitherto produced by actuating the accelerator pedal, the brake pedal or the clutch pedal. In corresponding aircraft, the side rudder is correspondingly actuated. In the event of a collision, the compression effect serves to absorb the thrust force acting on the feet of the operator in the event of deformation of the vehicle, and in that way reduces the risk of injury.

In a preferred embodiment of the invention the shaped body comprises an elastic material. Advantageously, the elastic material is porous, in which case the pores may certainly be of an irregular arrangement. In that respect, in regard to the frequency distribution of the size of the pores, a variance which is not zero is to be provided. In a desirable variant the shaped body comprises an elastomer.

Preferably the shaped body comprises two shaped body portions which are arranged conductively one above the other. Each of the shaped body portions on the surface remote from the respective other shaped body portion, is completely provided with a respective electrical contact region. The respective contact region is conductively connected on the one hand to the corresponding shaped body and on the other hand to a respective feed line.

Advantageously, the moduli of elasticity of the materials forming the shaped body portions are of different magnitudes, wherein the shaped body portions, along a connecting line between the two contact regions, are of different extents in such a way that a spacing, referred to as the pressure point, of the two contact regions occurs, at which only one of the two shaped body portions is substantially completed compressed.

In an advantageous embodiment the shaped body which is provided with the corresponding contact regions and feed lines is enclosed by an insulating material. In this arrangement, the material is to be provided in such a way that the surfaces covering the respective contact regions are stiffened so that a pressure locally exerted in the stiffened region is applied to the shaped body in substantially uniformly distributed fashion over the stiffened region. The material encasing the other regions of the shaped body is of a yielding nature.

In accordance with an advantageous development of the invention the signal converter of any actuating apparatus has a shaped body comprising a cellular polyurethane or cellular vulkollan, whose electrical resistance decreases upon volume compression. That material absorbs substantial energy with progressive deformation thereof so that thrust or shock energy acting on the feet of the operator is reduced.

The cell structure of the shaped body comprising an elastomer is formed by homogenous superimposition of two structure elements. The shaped body is porous, with the pores being arranged in irregularly distributed manner. For that purpose, incorporated in the pores of the elastomer are balls, preferably hollow balls, which themselves are compressible and electrically conductive. That advantageously provides that a reduction in the electrical resistance is achieved by a relatively large number of contact locations within the compressed shaped body.

Mounted to the shaped body is a first contact region which extends over the entire surface towards the driver, and which is conductively connected to the shaped body. The contact region is further provided with a feed line which is taken outwardly from the signal converter through the shaped body. A second contact region of the shaped body, which is arranged in opposite relationship to the first contact region, is conductively connected to a feed line. The shaped body is enclosed by an insulating material in the manner of a housing, wherein the material is stiff in the region of the wall regions of the housing, which cover the contact regions, while in the other wall regions the material is pliable. That thus means that a pressure locally applied in the stiffened region is applied to the shaped body in such a fashion as to be substantially uniformly distributed over the stiffened region.

The invention affords the advantageous option of so designing a novel actuating element which can advantageously be integrated into the electronic signal processing system of present-day motor vehicle technology, that in the event of an accident it forms a safety element.

By virtue of the additional inclusion of elastic elements in the form of balls in the pores of the elastomer, preferably cellular polyurethane or cellular vulkollan, the shaped body can have a compression characteristic of a desirable configuration. That configuration of the compression characteristic of the shaped body which for example forms a compressibly shock-absorbing foot well lining in a motor vehicle with a maximum level of energy absorption in the final deformation region has in particular an initial region where the shaped body can be deformed in a finely controllable manner and there is a substantially linear relationship between the absorbed energy E and the compression stroke distance S.

If the elastomer body is porous or if the inclusions are in the form of conductive hollow bodies, the range of variation in the electrical resistance which alters when the body is compressed is increased. The pores or cavities thus form contact surfaces which increasingly come into contact with each other when compression occurs, and thus markedly reduce the electrical resistance of the overall arrangement, because of the distances to be traversed by the electric current being reduced.

As the shock-absorbing foot well lining is designed for maximum energy absorption in the final deformation region, in contrast with a substantial compression stroke distance S there is a functional relationship such that the mechanical energy E which is absorbed upon compression by the foot well lining rises in an over-proportional fashion. In the region of considerable compression, the compression characteristic is of a substantially quadratic or exponential characteristic configuration.

In an advantageous embodiment the signal converter of the design configuration as described hereinbefore is grooved in the region of a first contact region or is provided in some other fashion with a surface coating which increases the coefficient of friction so that the foot enjoys non-slip contact therewith.

Preferably, arranged downstream of the signal converter is a measurement transducer whose inputs are connected by way of the feed lines to the first and a second contact region. The measurement transducer includes a voltage source which applies a substantially constant electrical voltage between the first and the second contact regions. In an advantageous embodiment there is provided a current source which produces an electrical current of substantially constant amplitude between the first and the second electrical contact regions. There is preferably provided a transducer which at the input side is connected to the feed lines and at the output of which there is produced an analog electrical parameter. The analog electrical parameter is advantageously applied to an input amplifier which boosts the amplitude of the analog electrical parameter as a measurement in respect of the electrical resistance. In an advantageous variant the measurement transducer has an analog-digital converter which receives the analog parameter as an input signal and outputs it in the form of a digital parameter.

Preferably there is provided a function generator to which the analog or digital parameter is applied and at the output of which there is a control signal which is in an unequivocal relationship with the parameter or the variation in time thereof. In an advantageous variant the function generator has a memory to which the analog or digital parameter is fed. The arrangement also has a differentiation stage which receives the current parameter and a previous parameter called up from the memory as input signals and which outputs a differentiation value which represents a measurement in respect of the variation in time of the parameter. Advantageously the function generator has a linearization member to which the parameter or the differentiation value is applied as an input signal and at the output of which occurs the control signal. Ultimately the control signal activates the drive or retardation means.

In an advantageous embodiment, to control the drive or retardation means in dependence on a predetermined parameter, there is provided a first threshold stage which receives the parameter as an input signal and which outputs a control signal which is of a first characteristic value when the parameter is greater than or equal to a predetermined parameter threshold or a second characteristic value when the parameter is smaller than the predetermined parameter threshold. In a further advantageous variant the function generator, for controlling the drive or retardation means in dependence on a predetermined differentiation value, has a second threshold stage which receives the differentiation value as an input signal and which outputs a control signal which is of a constant first differentiation magnitude when the differentiation value is greater than or equal to a predetermined differentiation value threshold and which is of a second differentiation magnitude when the differentiation value is less than the predetermined differentiation value threshold.

Advantageously the function generator also has a table store or memory in which there is associated with each digital value of the parameter and/or of the differentiation value a corresponding value of the control signal.

In an advantageous embodiment the measurement transducer further includes an output stage which receives the control signal and increases it in terms of its amplitude.

Preferably, there is provided an apparatus which detects the derivative of the change in the electrical resistance determined by the control signal and which in the event of a fast change in the electrical resistance increases the acceleration of the vehicle so that a kick-down effect is produced.

An advantageous variant provides three actuating apparatuses, wherein a first actuating apparatus influences the vehicle engine, a second actuating apparatus influences the braking system and a third actuating apparatus influences the clutch. In that case, the signal converters of the actuating apparatuses are preferably integrated into an overall shaped body, wherein the actuating surfaces of the actuating apparatuses are arranged in mutually juxtaposed relationship in a surface of the overall shaped body in such a way that the actuating surface of the first actuating apparatus is to the right, that of the second actuating apparatus is in the center and that of the third actuating apparatus is to the left. In an advantageous embodiment the actuating surface of the second actuating apparatus is substantially larger than the actuating surfaces of the other apparatuses. Furthermore, the spacing between the actuating surfaces of the second and third actuating apparatuses is to be larger than that between the actuating surfaces of the first and second actuating apparatuses. The actuating group formed from the three actuating apparatuses is installed on the driving side in the front wall defining the foot well in the direction of travel, in such a way that the three actuating surfaces face towards the driver.

In another embodiment of the invention the shaped body comprises a closed housing which is variable in volume and which is let into the front wall. In that arrangement the actuating apparatus has a pressure-receiving member of a mat-like configuration, which is fixed to the housing in such a way as to be accessible to the driver from the foot well of the passenger cell of the motor vehicle. The housing is of a two-part structure and is preferably of a cuboidal configuration. It has a cup-shaped bottom portion and a cover of the same shape. The walls of the bottom portion and of the cover which engages over the bottom portion are connected together in the form of a guide means and are arranged displaceably relative to each other. In that arrangement the housing portions are of a stiff nature.

Provided in the interior of the housing are a plurality of spring elements by way of which the housing cover which carries the pressure-receiving member is supported on the bottom and which urge the housing cover into its initial position after a pressure loading has been applied. Due to the action of the spring elements, the impression of the existence of a conventional pedal construction is also generated in the person actuating the actuating apparatus, in a psychologically desirable fashion, although the force loading the actuating apparatus does not act directly on the drive or retardation means of the motor vehicle but is converted into a preferably electrical control signal which in turn activates the drive or retardation means.

In accordance with an advantageous development of the invention the spring elements are in the form of straight coil springs with a non-linear characteristic whereby the counteracting pressure of the spring elements increases in the event of a heavy pressure loading on the pressure-receiving member, that is to say upon a relatively great reduction in the volume of the housing, and increases the impression of the existence of a conventional pedal arrangement for actuation of the drive or retardation means of a motor vehicle.

In accordance with another development of the above-described embodiment of the invention, the pressure-receiving member in the form of a receiving surface is of a structural configuration such that as a structural unit it represents an electrical resistance which is variable in dependence on pressure, an inductance or a capacitance which is variable by pressure-dependent deformation. The change in the corresponding resistance, capacitance and inductance values results in changes in voltage for example due to a variation in the equilibrium of a resistance bridge or upon detuning of a resonant circuit, which changes in voltage after amplification can be used as a control voltage for activation of the engine, the brake or the clutch of the motor vehicle.

It is equally also possible to use a pressure-receiving member which is in the form of a hydraulic system and in which different control voltages are activated by means of a hydraulic medium in dependence on pressure by way of contact means.

Advantageous developments of the invention are characterized in the appendant claims or are set forth in greater detail hereinafter together with the description of the preferred embodiment of the invention. In the drawings:

Figure 1:
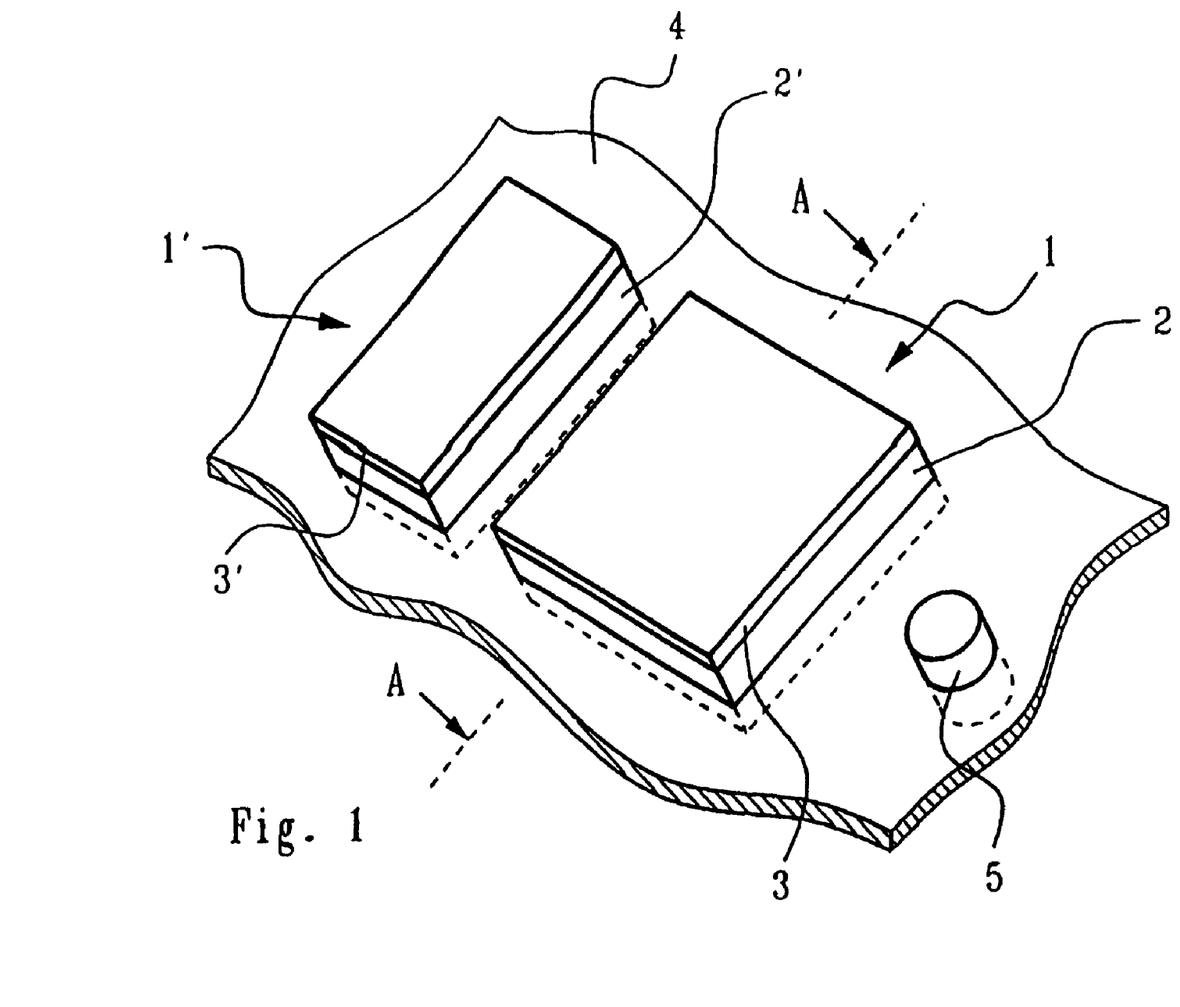
FIG. 1 is a perspective view of an actuating group with three actuating apparatuses for controlling a braking or clutch arrangement, wherein the respective actuating apparatus has a variable-volume housing with a pressure-receiving member mounted thereon.

Shown in the portion, as illustrated in a perspective view in FIG. 1, of a front wall 4 disposed between the engine compartment and the passenger compartment of a motor vehicle, is the position of an actuating apparatus 1, 1' according to the invention for the braking arrangement or clutch arrangement (not shown) of a motor vehicle. The actuating apparatuses 1, 1' each have a cuboidal housing 2, 2', while a pressure-receiving member 3, 3' is secured to the wall portion of the housing 2, 2', which projects into the foot region of the passenger compartment and which extends in a plane parallel to the wall 4.

The respective pressure-receiving member 3, 3', as part of an electrical or pneumatic converter system, is capable when a pressure loading is applied thereto of triggering an electrical control voltage which activates the braking or clutch arrangement of the motor vehicle. The housing 2, 2' of the respective actuating apparatus 1, 1', which carries the pressure-receiving member 3, 3' which is of a mat-like nature is arranged displaceably perpendicularly to the plane defined by the wall 4 and is completely recessed into the wall 4 when a maximum pressure force is applied to the pressure-receiving member 3, 3' or the latter is loaded by feet or legs of the vehicle driver in the event of the motor vehicle being involved in a frontal impact. Such a configuration and arrangement of an actuating apparatus 1, 1' advantageously substantially eliminates the risk of injury caused by the actuating apparatus to the feet of the vehicle driver in the event of the vehicle being involved in a frontal impact. In addition to the actuating apparatuses 1, 1', the drawing also diagrammatically illustrates an actuating apparatus 5 for actuation of the vehicle engine.

Figure 2:
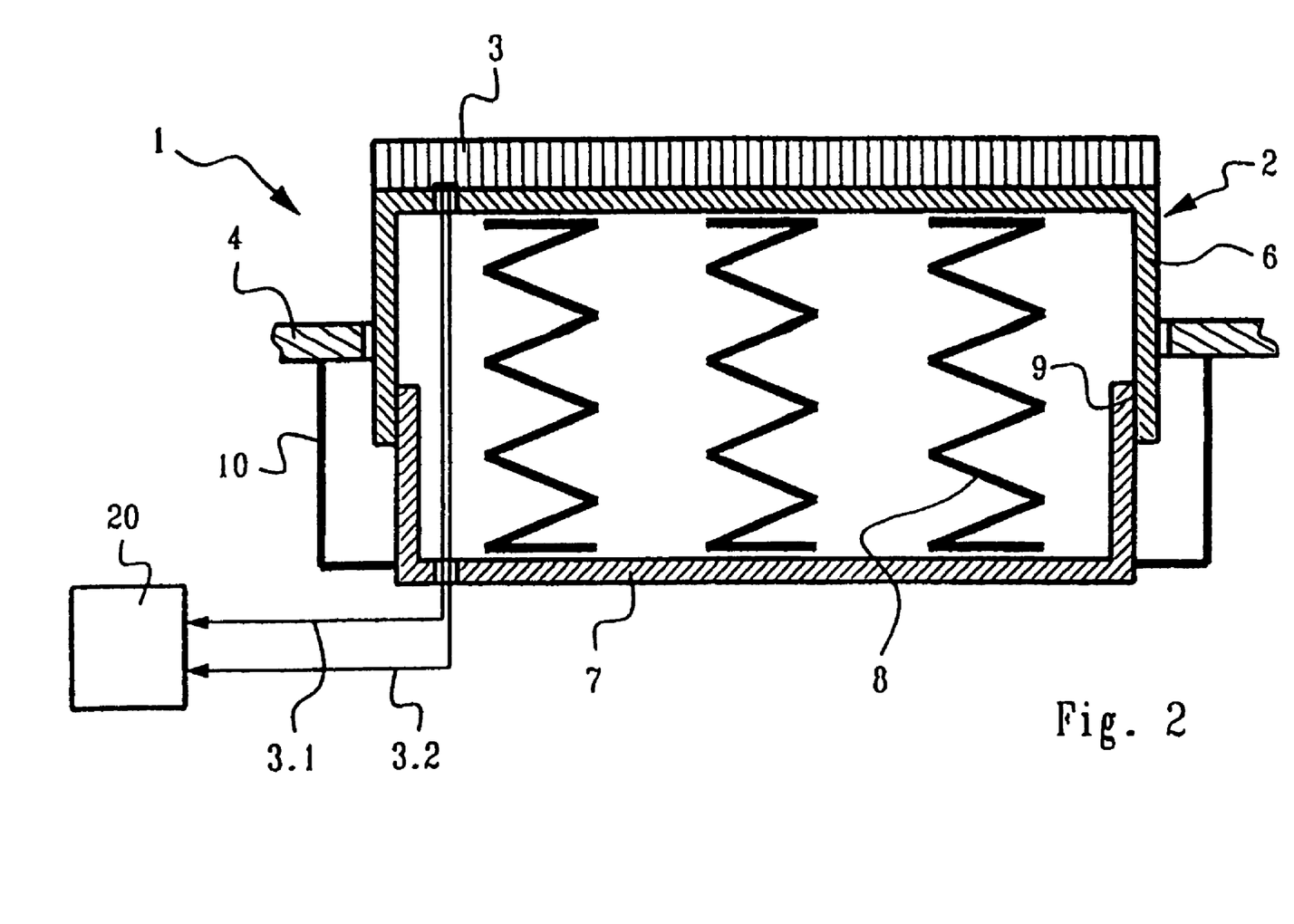
FIG. 2 is a view in section taken along line A . . . A in FIG. 1.

In FIG. 2 the actuating apparatus 1 is shown as a diagrammatic view in section taken along line A . . . A in FIG. 1. The housing 2 of the actuating apparatus 1 is fixed in position by means of a holder provided at the side of the wall 4, which is towards the engine compartment. The cuboidal housing 2 which is of a two-part nature has a cup-shaped bottom portion 7 and a cover 6 which is also of a cup-shaped configuration and which engages over the bottom portion 7. The bottom portion 7 and the cover 6 are connected together by a rectilinear guide 9.

On its front the housing cover 6 carries the pressure-receiving member 3 which is of a mat-like nature. Arranged in the interior of the housing 2 in a symmetrical configuration are three spring elements 8 on which the cover 6 is supported against the housing bottom portion 7 when the pressure-receiving member 3 is loaded in the appropriate fashion. The spring elements are in the form of straight coil springs and return the housing cover 6 back to its starting position when the actuating apparatus 1 is no longer subjected to a pressure loading. A non-linear characteristic of the spring elements 8 advantageously produces a counteracting pressure which is sufficiently great for the pressure loading, and at the same time upon operation by the vehicle driver they provide an operating characteristic in respect of the actuating apparatus 1 according to the invention, which substantially corresponds to an actuating apparatus which is fitted with pedals.

Displaceability of the housing cover 6, which is ensured by the spring elements 8 and the guide means 9, in the event of the vehicle being involved in a frontal impact, makes it possible for the parts of the actuating apparatus 1, which project into the foot well of the passenger compartment cell, to be completely lowered into the plane defined by the wall 4. That advantageously almost completely eliminates the risk of foot injury, arising out of the presence of the actuating apparatus. The signal lines 3.1 and 3.2 of the pressure-receiving member 3 are taken through the bottom portion 7 of the housing into the engine compartment and connected to a system 20 in which the transducers and amplifiers necessary to produce the required control voltage and the motor vehicle braking or clutch arrangement to be activated are combined.

Figure 3:
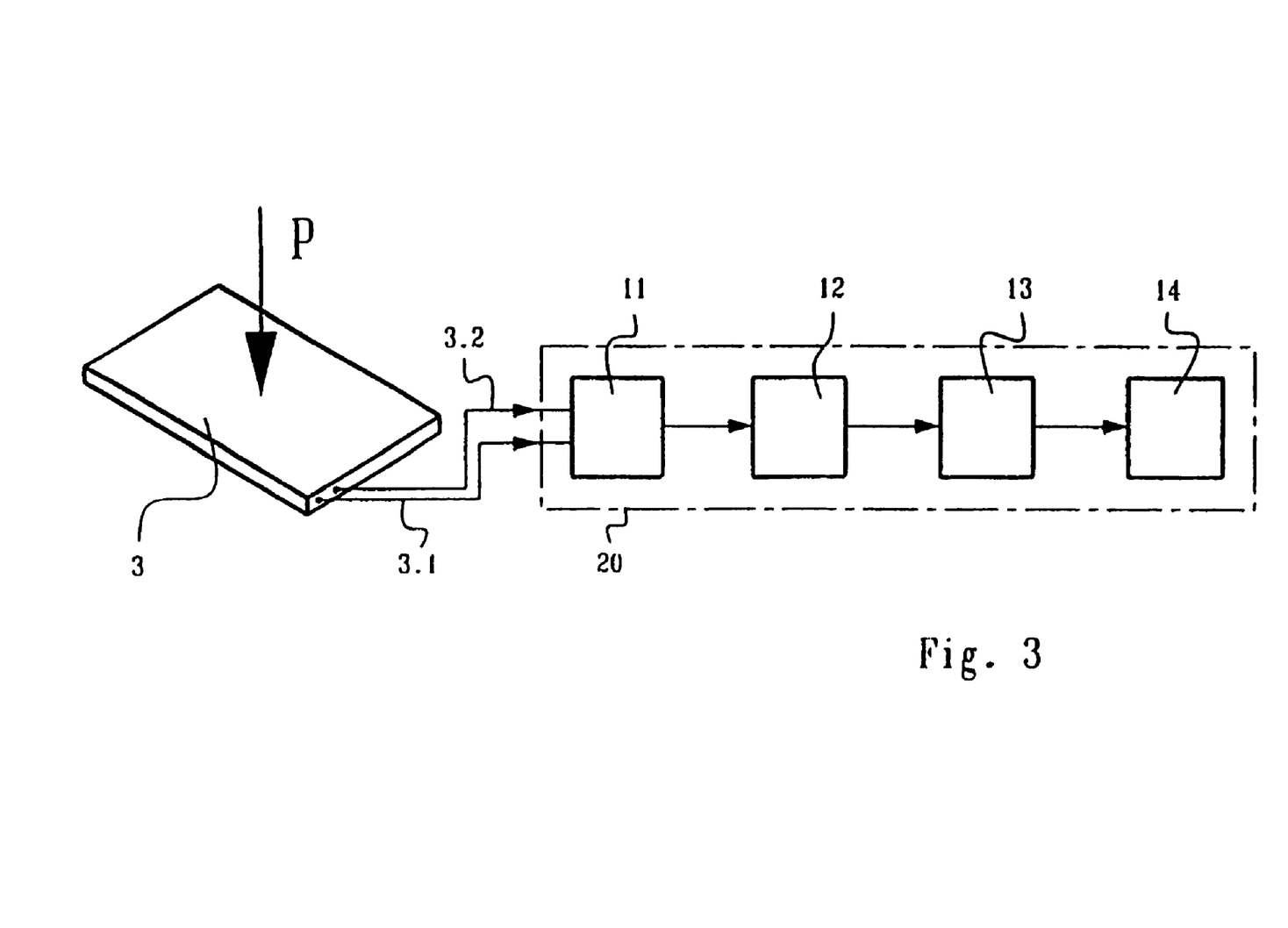
FIG. 3 shows a block circuit diagram for the control of a braking or clutch arrangement of a motor vehicle by means of an actuating apparatus as shown in FIG. 1.

The electrical block circuit diagram shown in FIG. 3 for the control of a braking or clutch arrangement of a motor vehicle by means of an actuating apparatus according to the invention shows the structure of the system 20 in greater detail. In this case the mat-type pressure-receiving member 3 is of a variable-pressure nature and is acted upon by a surface load P. The signal lines 3.1 and 3.2 make a connection to an electrical resonant circuit 11 whose resonance frequency is varied by the parallel connection of the pressure-receiving member and the different loading thereon. The resulting voltage fluctuation is adapted in an amplifier 12 to the required input level of a servo or adjusting member 13 for activating the braking or clutch arrangement 14 of the vehicle.

Figure 4:
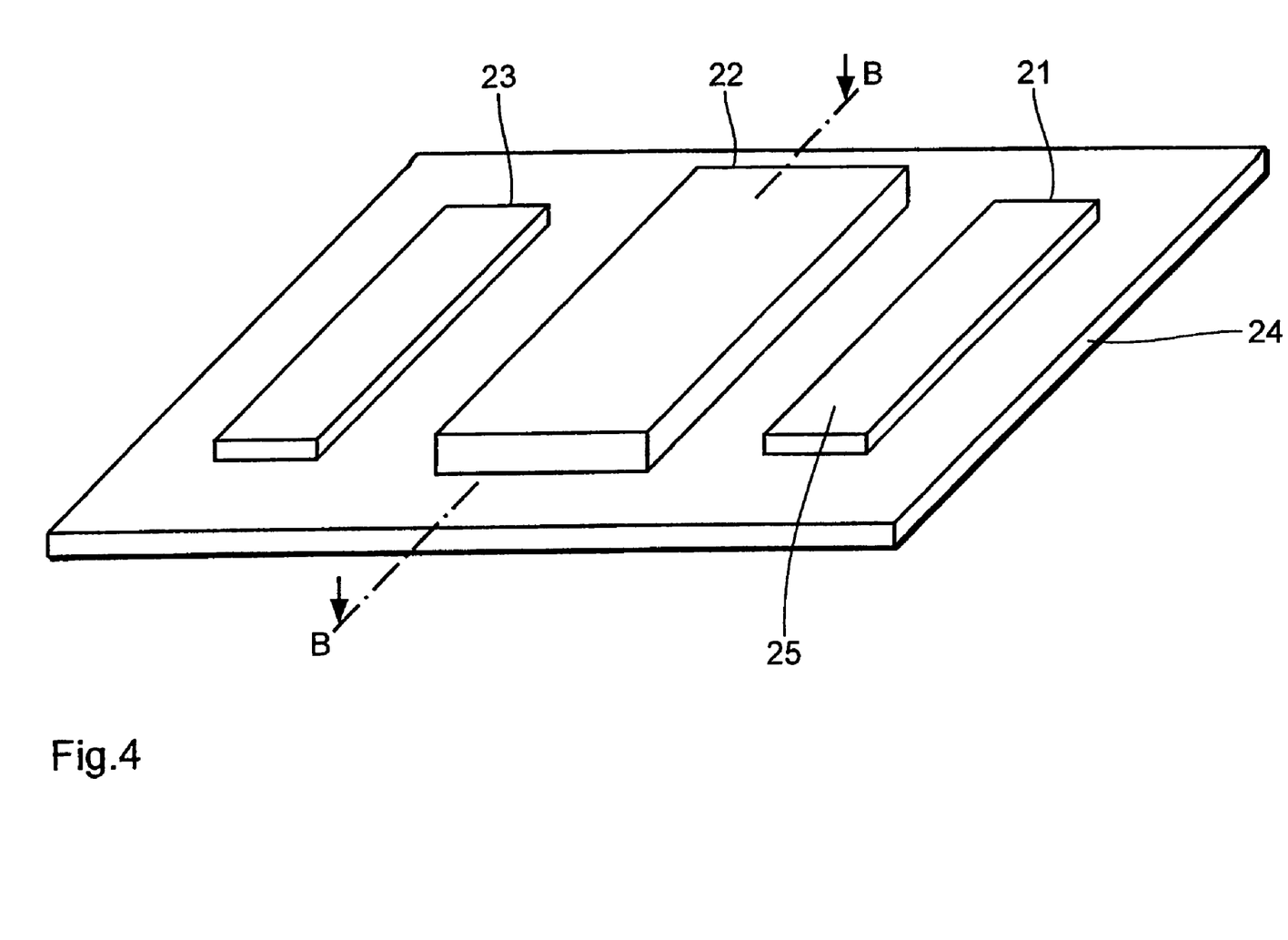
FIG. 4 is a perspective view of an actuating group with three actuating apparatuses for controlling a drive or retardation means, wherein the respective actuating apparatus has a shaped body comprising an elastic material, in accordance with the preferred embodiment.

FIG. 4 shows an actuating group comprising three actuating apparatuses 21, 22 and 23, as a perspective view of the preferred embodiment. In this case the actuating apparatuses 21, 22, 23 are each shown in the form of their respective signal converter. The first actuating apparatus 21 serves to actuate a vehicle engine, the second actuating apparatus 22 serves to actuate a braking system and the third actuating apparatus 23 serve to actuate a clutch. In this case the actuating apparatuses 21, 22, 23 are the same in terms of their structural configuration, with the second actuating apparatus 22 being markedly larger than the others. In addition the spacing between the second actuating apparatus 22 and the third actuating apparatus 23 is greater than the spacing between the first actuating apparatus 21 and the second actuating apparatus 22. The signal converters of the three actuating apparatuses 21, 22, 23 are integrated into an overall shaped body 24, with the actuating surfaces 25 of the actuating apparatuses being disposed in one surface. In this case the overall shaped body 24 has in parallel relationship with the actuating surfaces three rear openings which are not visible in FIG. 4 and through which the feed lines extending from the signal converters are taken outwardly through the overall shaped body 24. In a manner which is not shown in the drawing, the shaped body 24 is fitted at the driving side into the wall delimiting the foot well in the direction of travel, in such a way that the three actuating surfaces 25 face towards the driver.

Figure 5:
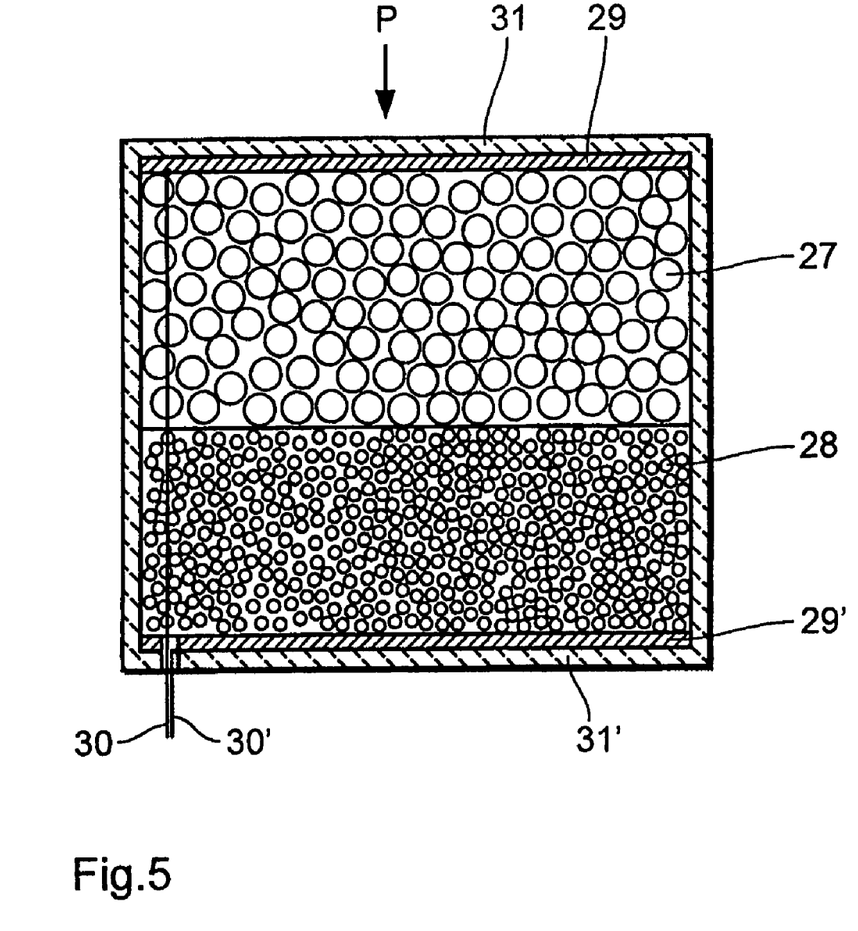
FIG. 5 is a view in section taken along line B . . . B in FIG. 4.

The signal converter 26, which is shown in detail in FIG. 5, of any actuating apparatus 21, 22, 23 has a shaped body which is composed of two shaped body portions 27, 28. The shaped body portions 27, 28 each comprise an elastic material and are porous, with the pores being irregularly arranged. In the illustrated view the pores of the shaped body portion 27 which is towards the driver are larger than those of the shaped body portion 28. At the same time the modulus of elasticity of the material forming the shaped body portion 27 is greater than that of the material of the shaped body portion 28 so that, when a surface force P is applied perpendicularly to the surface of the shaped body portion 27 which is towards the driver, essentially only the latter is compressed. Disposed on the shaped body portion 27 is a first contact region 29 which extends over the entire surface area which faces towards the driver, and is conductively connected to the shaped body portion 27. The contact region 29 is further provided with a feed line 30 which is taken outwardly from the signal converter 26 through the shaped body portions 27 and 28. A second contact region 29' is disposed on the surface of the shaped body portion 28, which is remote from the shaped body portion 27, and in the same way as the first contact region 29 is conductively connected to the shaped body portion 28 and a feed line 30'. The shaped body which is composed of the shaped body portions 27 and 28 is enclosed by an insulating material in the manner of a housing, in which case the material in the region of the surfaces 31, 31' covering the contact regions 29, 29' is stiff while it is pliable in the other surfaces. In the region 31' the insulating material is provided with an opening for the feed lines 30, 30' to be taken out.

Figure 6:
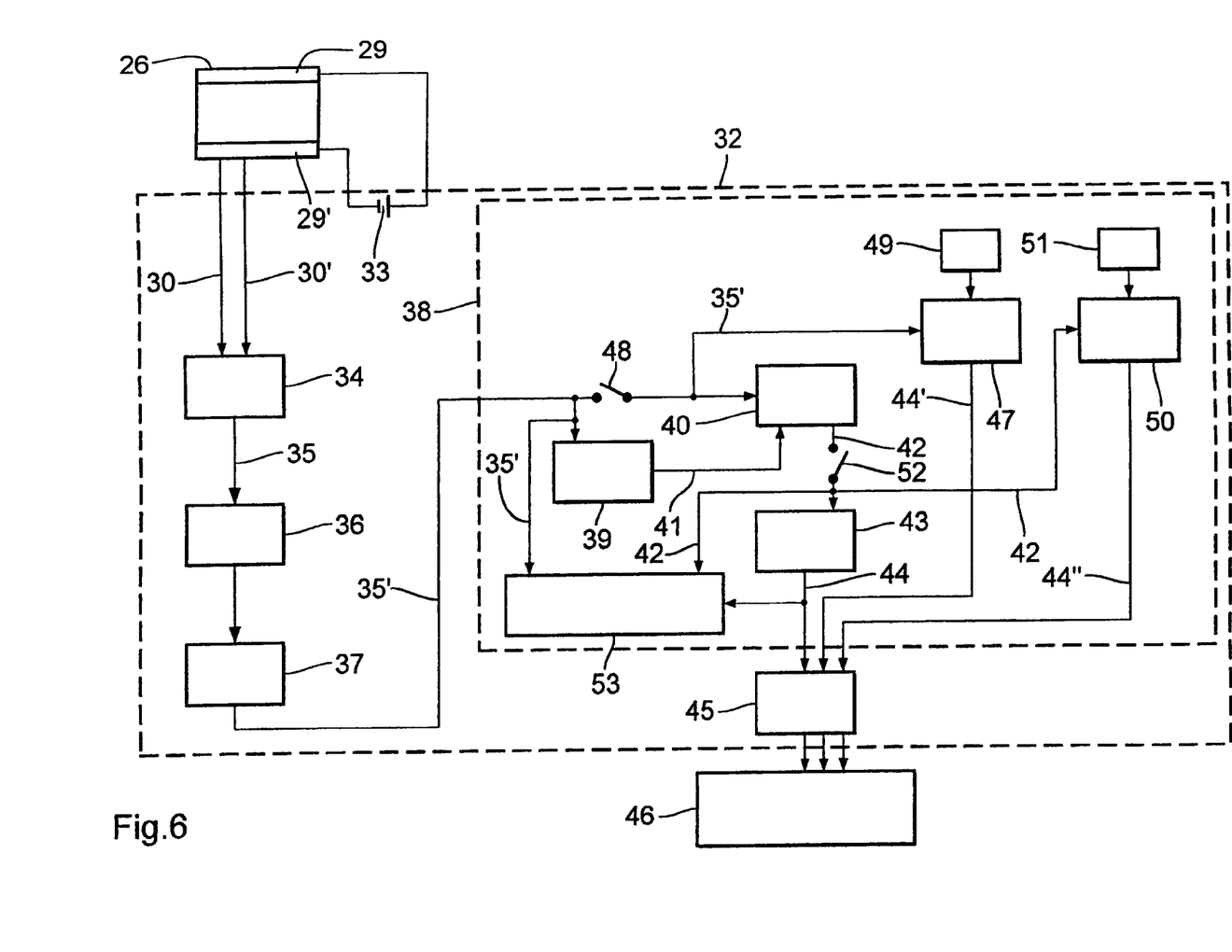
FIG. 6 shows a block circuit diagram of an actuating apparatus as shown in FIG. 4.

Disposed downstream of the signal converter 26 is a measurement transducer 32 which has a plurality of devices and whose inputs, as shown in the block circuit diagram of FIG. 6, are connected by way of the feed lines 30, 30' to the two contact regions 29, 29' of the signal converter 26. The measurement transducer 32 includes a voltage source 33 which applies a substantially constant electrical voltage between the first contact region 29 and the second contact region 29'. The arrangement also includes a transducer 34 which is connected at its input side to the feed lines 30, 30' and at the output of which an analog electrical parameter 35 is outputted. The parameter 35 is fed to an input amplifier 36 which boosts the parameter 35 in respect of its amplitude. A downstream-connected analog/digital converter 37 receives the analog parameter 35 as an input signal and outputs same in digitized form. The digitized parameter 35' is fed to a function generator 38, the function generator 38 including a plurality of devices. Provided among such devices is a memory 39 to which the parameter 35' is fed. The function generator 38 has a differentiation stage 40 which receives the parameter 35' and a previous parameter 41 outputted by the memory 39, and outputs a differentiation value 42 as a measurement in respect of the variation in time of the parameter 35. Connected downstream of the differentiation stage 40 is a linearization member 43 to which the differentiation value 42 is fed and which outputs a first control signal 44, wherein the first control signal 44 is in a linear relationship with the spacing or the variation in the spacing between the two contact regions 29, 29'.

The measurement transducer 32 further includes an output stage 45 which boosts the first control signal 44 in respect of its amplitude. The control signal 44 activates a drive or retardation means 46.

To control the drive or retardation means 46 in dependence on a predetermined parameter, there is first threshold stage 47 which, upon previous actuation of a switch 48, outputs a second control signal 44' which is fed instead of the first control signal 44 to the drive or retardation means 46 by way of the output stage 45. A predetermined parameter threshold value 49 is previously transferred to the first threshold stage 47. The threshold stage 47 receives the digital parameter 35' as an input signal and outputs the second control signal 44' which is of a first characteristic value when the digital parameter 35' is greater than or equal to the parameter threshold value 49 and which is of a second characteristic value when the parameter 35' is less than the parameter threshold value 49.

To control the drive or retardation means 46 in dependence on a predetermined differentiation value, there is provided a second threshold stage 50 to which a predetermined differentiation value threshold 51 is fed, wherein the second threshold stage 50 outputs a third control signal 40" upon previous actuation of a switch 52. The third control signal is applied to the input of the drive or retardation means 46, in a manner corresponding to the first control signal 40 and the second control signal 40'.

The function generator 38 also has a table memory or store 53 to which the digital parameter 35' and/or the differentiation value 42 and the control signal 44 are fed, wherein in the table memory 53 there is associated with each value of the respective parameter 35' and/or the differentiation value 42 a corresponding control signal 44.

Figure 7:
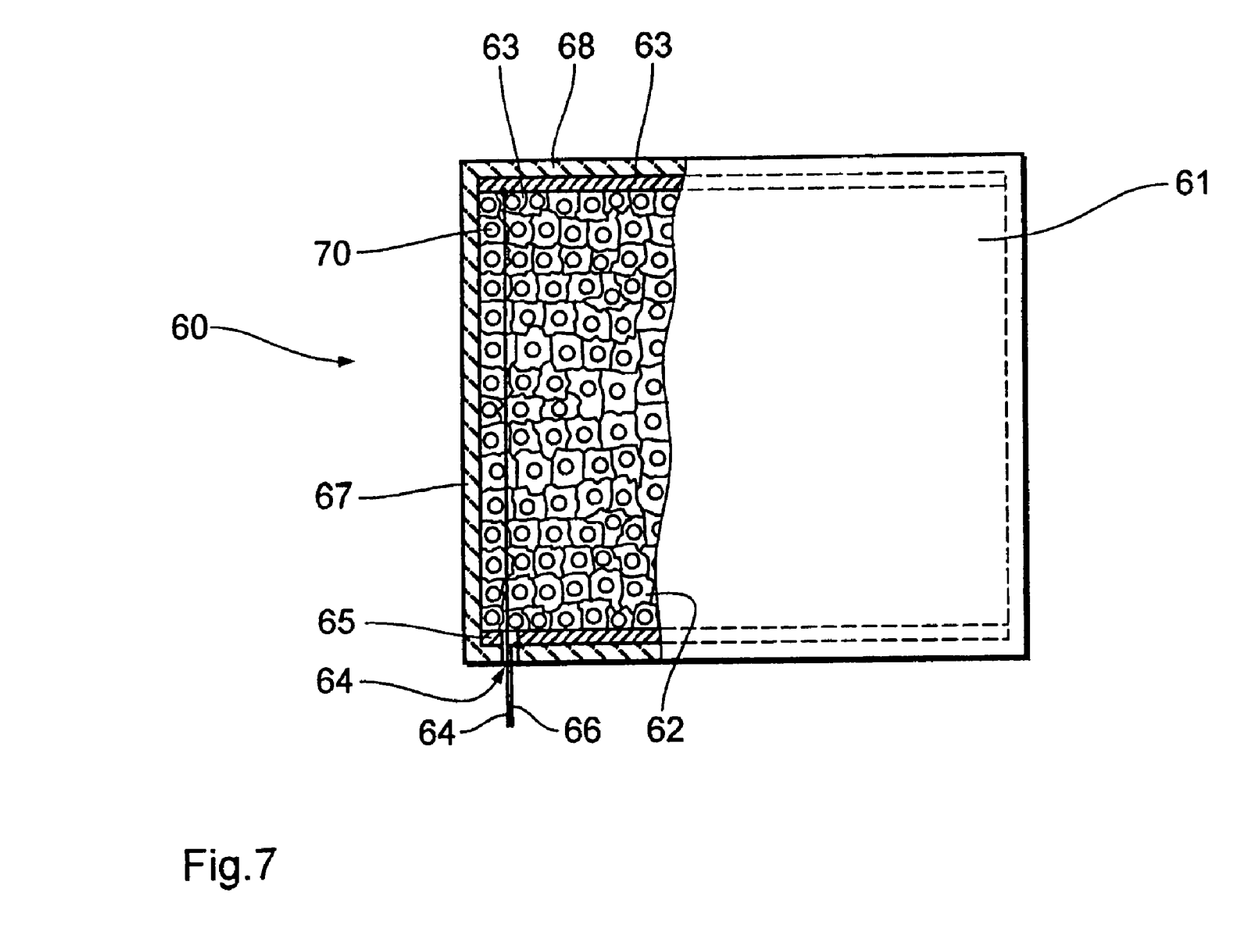
FIG. 7 shows an advantageous development of the invention as a section taken along line B . . . B in FIG. 4.

The signal converter 60 which is shown in detail in FIG. 7 of any actuating apparatus (see references 21, 22 and 23 in FIG. 4) has a shaped body 61 comprising a cellular polyurethane or cellular vulkollan, the electrical resistance of which is reduced upon a compression in respect of its volume.

The shaped body 61 is porous, with the pores 62 being irregularly arranged. Disposed on the shaped body 61 is a first contact region 63 which extends over the entire surface that faces towards the driver, and is conductively connected to the shaped body 61. The contact region 63 is further provided with a feed line 64 which is taken outwardly from the signal converter 60 through the shaped body 61. A second contact region 65 of the shaped body 61, which is arranged opposite the first one, is conductively connected to a feed line 66. The shaped body 61 is enclosed by an insulating material in the manner of a housing, wherein the material in the region of the wall regions 67 and 68 of the housing, which cover the contact regions 63 and 65, is stiff, while it is flexible and yielding in the other wall regions of the housing. In that way a pressure exerted locally in the stiffened region 68 can be applied to the shaped body 61 in such a way as to be distributed substantially uniformly over the stiffened region.

Provided in the contact region 65 and in the stiff wall region 67 is an opening 69 to take out the lines 64 and 66 which are to be connected to a measurement transducer (see reference 32 in FIG. 6).

The cell structure of the shaped body 61 comprising an elastomer is formed by mutual superimposition of two structure elements. For that purpose, incorporated in the pores 62 of the elastomer are balls 70, preferably hollow balls, which are themselves compressible and electrically conductive.

Figure 8:
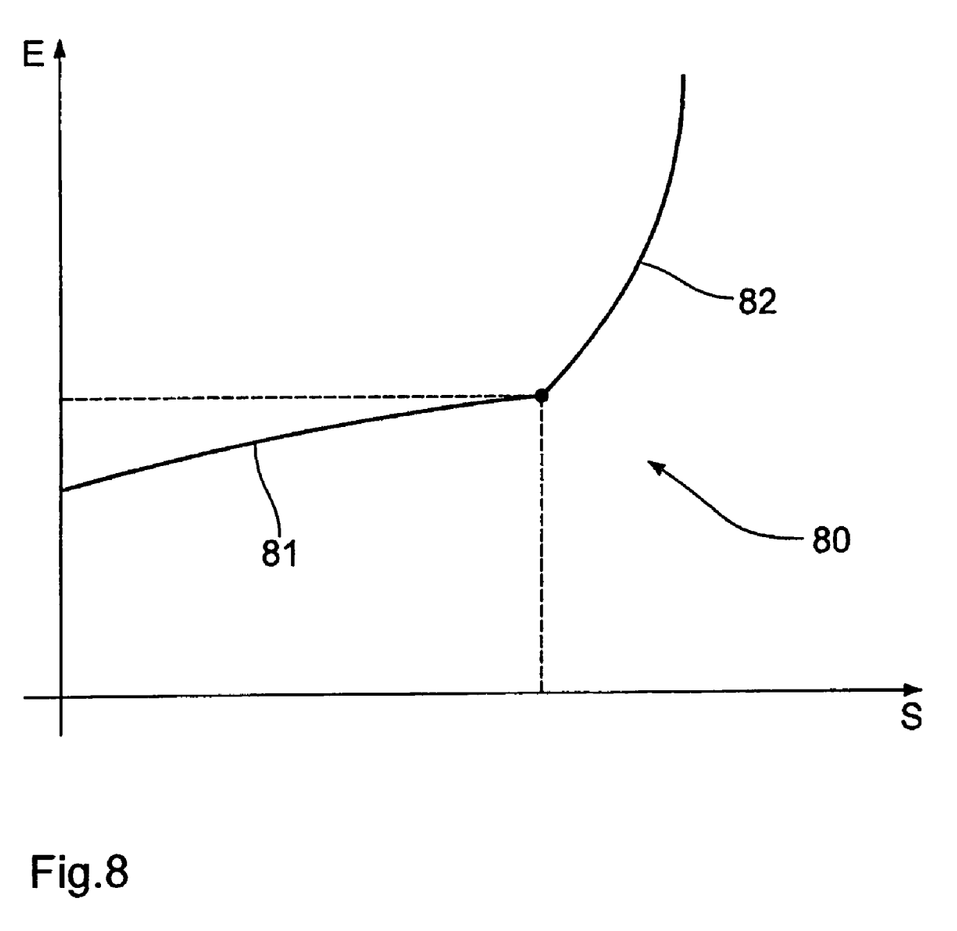
FIG. 8 shows a compression characteristic of the development of the invention as shown in FIG. 7.

By virtue of the inclusion of elastic elements in ball form in the pores of the elastomer, preferably cellular polyurethane or cellular vulkollan, the shaped body 61 has a special compression characteristic 80 which is shown in diagrammatic form in FIG. 8.

The curve configuration of the compression characteristic 80 of the shaped body (see reference 61 in FIG. 7) which for example forms a compressibly shock-absorbing foot well lining in a motor vehicle with maximum energy absorption in the final deformation region has an initial region 81 where the shaped body can be deformed in a finely controllable manner and there is substantially linear relationship between absorbed energy E and compression stroke distance S.

As the shock-absorbing foot well lining is designed for maximum energy absorption in the final deformation region 82, there is in contrast in the case of a large compression stroke distance S a functional relationship such that the mechanical energy E absorbed upon compression increases in over-proportional fashion.

In the region of severe compression 82 the compression characteristic 80 has a substantially quadratic or exponential configuration.

The invention is not limited in terms of implementation thereof to the preferred embodiment set forth hereinbefore. On the contrary a large number of alternative configurations are possible, which make use of the illustrated structure even in configurations of a basically different kind.

The invention claimed is:

1. An actuating apparatus for operating a drive, steering or retardation means of a motor vehicle, comprising a signal converter (26; 60) which produces a control signal dependent on an actuating travel, characterized in that the signal converter (26; 60) comprises an elastic and conductive shaped body having a first and a second outside surface which are arranged at a spacing relative to each other, which is provided with a first electrical contact region (29; 62) which extends over the first outside surface of the shaped body and which is galvanically conductively connected to the shaped body and to a first feed line (30; 64) and a second electrical contact region (29'; 63) which extends along the second surface of the shaped body and is galvanically conductively connected to the shaped body and to a second feed line (30'; 65), wherein electrical resistance of the shaped body between the first and second electrical contact regions (29, 29'; 62, 63) is dependent on the spacing of the first second electrical contact regions (29, 29'; 62, 63) and that connected downstream of the signal converter (26; 60) is a measurement transducer (32) whose inputs are connected by way of the first and second feed lines (30, 30'; 64, 65) to the first and second electrical contact regions (29, 29'; 62, 63) and at whose output a control signal (44) can be taken off, which is dependent on the electrical resistance of the shaped body, wherein the shaped body (61) has a compression characteristic (80) E=f(S) with regions of different compression in respect of volume, in particular with a region (81) with a low level of compression in respect of volume and a region (82) of high compression in respect of volume, in such a way that a substantially linear relationship between compression stroke distance S and mechanical energy E absorbed upon compression exists in the region of the low level of compression in respect of volume and an over-proportionally non-linear relationship between the compression stroke distance S and the mechanical energy E absorbed upon compression exists in the region of the high level of compression in respect of volume.

2. An actuating apparatus as set forth in claim 1 characterized in that the measurement transducer (32) has a voltage source (33) which applies a substantially constant electrical voltage between the first and second electrical contact regions (29, 29'), or that the measurement transducer (32) includes a current source which produces a substantially constant current between the first and second electrical contact regions (29, 29').

3. An actuating apparatus as set forth in claim 1 characterized in that the measurement transducer (32) includes an input amplifier (36) which is connected (30; 30') at the input side to the first and second feed lines.

4. An actuating apparatus as set forth in claim 1 characterized in that the measurement transducer (32) has an analog/digital converter (37) which receives an analog parameter (35) as an input signal and digitizes it.

5. An actuating apparatus as set forth in claim 1 characterized in that the measurement transducer (32) has a function generator (38) which receives the analog parameter (35) or a digital parameter (35') as an input signal and at whose output the control signal (44) which is in an unequivocal functional relationship with the received parameter (35, 35') can be taken off.

6. An actuating apparatus as set forth in claim 5 characterized in that the function generator (38) has a differentiation stage (40) which receives a current parameter (35, 35') and a previous parameter (41) called up from memory (49) as input signals and outputs at its output a differentiation value (42) which represents a measurement in respect of a variation in time of the current parameter (35).

7. An actuating apparatus as set forth in claim 6 characterized in that the function generator (38) forms a linearization member (43) which receives the parameter (35, 35') or the differentiation value (42) as an input signal and at its output there can be taken off a control signal (44) which is in a linear relationship with the spacing or the change in the spacing between the two contact regions (29, 29').

8. An actuating apparatus as set forth in claim 6 characterized in that the function generator (38) has a first threshold stage (47) which receives the analog or digital parameter (35, 35') as an input signal and at whose output a control signal (44') can be taken off, which is of a first characteristic value when the received parameter (35, 35') is greater than or equal to a predetermined parameter threshold value (49) and which is of a second characteristic value when the received parameter (35, 35') is less than the predetermined parameter threshold value (49).

9. An actuating apparatus as set forth in claim 6 characterized in that the function generator (38) has a second threshold stage (50) which receives the differentiation value (42) as an input signal and at whose output a control signal (44") can be taken off, which is of a constant first differentiation magnitude when the differentiation value (42) is greater than or equal to a predetermined differentiation value threshold (51) and which is of a second differentiation magnitude when the differentiation value (42) is less than the predetermined differentiation value threshold (51).

10. An actuating apparatus as set forth in claim 6 characterized in that the function generator (38) has a table memory (53) in which there is associated with each digital value of the parameter (35') and/or of the differentiation value (42) a corresponding value of the control signal (44).

11. An actuating apparatus as set forth in claim 1 characterized in that the shaped body has inclusions, in particular in a form of electrically conductive balls or hollow balls (70) which in particular are also compressible.

12. An actuating apparatus as set forth in claim 1 characterized in that the shaped body (61) is in a form of a compressibly shock-absorbing foot well lining which reduces its electrical resistance upon a compression in respect of volume.

13. An actuating apparatus as set forth in claim 12 characterized in that the shaped body (61) comprises a cellular polyurethane or a cellular vulkollan.

14. An actuating apparatus as set forth in claim 11 characterized in that the elastic material is porous.

15. An actuating apparatus as set forth in claim 1 characterized in that the compression characteristic (80) is of a substantially quadratic or exponential configuration in the region (82) of the high level of compression in respect of volume.

16. An actuating apparatus as set forth in claim 1 characterized in that the signal converter (26) is enclosed by an insulating material which is stiff in the region or regions (31, 31') of the first and/or second electrical contact region (29, 29') so that a pressure exerted locally in the stiffened region is applied to the shaped body distributed uniformly over the stiffened region (31, 31'), and is yielding in other ones of the regions.

17. An actuating apparatus as set forth in claim 1 characterized in that in a region which is towards a person actuating the apparatus, the surface of the signal converter is provided with an increased coefficient of friction or a recess which is matched to a sole of the person operating the apparatus, so that same has a hold which is secured to prevent lateral displacement thereof.

18. An actuating apparatus as set forth in claim 1 characterized in that the shaped body comprises at least two shaped body portions (27, 28) which are arranged in conductive mutually superposed relationship in a direction perpendicular to a connecting line between the first electrical contact region (29) and the second electrical contact region (29'), wherein the moduli of elasticity of the materials of the shaped body portions (27, 28) are of different magnitudes, and the shaped body portions (27, 28) are of different extents along the connecting line so that there occurs a spacing of the first and second electrical contact regions (29, 29'), which is referred to as a pressure point and at which only one of the two shaped body portions (27, 28) is substantially completely compressed.

19. An actuating apparatus as set forth in claim 1 characterized in that there are provided means which detect a derivative of a variation in the electrical resistance and which increase an acceleration of the motor vehicle upon a relatively fast change in the electrical resistance so that a kick-down effect can be produced.

20. An actuating apparatus as set forth in claim 1 characterized in that it is part of a group of a plurality of actuating apparatuses (21, 22, 23) which are integrated into an overall shaped body (24), wherein actuating surfaces (25) of three actuating apparatuses (21, 22, 23) are disposed in mutually juxtaposed relationship operably in a surface of an overall shaped body (24) in such a way that the actuating surface (25) of the first actuating apparatus (21) is arranged to the right, the actuating surface of the second actuating apparatus (22) is arranged at the center and the actuating surface of the third actuating apparatus (23) is arranged to the left.

21. An actuating apparatus as set forth in claim 20 characterized in that the three actuating apparatuses are incorporated in a wall which separates a passenger compartment from an engine compartment, wherein the three actuating surfaces (25) face towards the driver.

* * * * *